United States Patent [19]
Lindqvist et al.

[11] Patent Number: 5,805,569
[45] Date of Patent: Sep. 8, 1998

[54] PACKET DATA COMMUNICATIONS SYSTEM HAVING A MALFUNCTION LIST

[75] Inventors: Pontus Lindqvist, Kungäly; Ingvar Gustaf Andersson, Billdal; Anders Henriksson; Per Erik Andersson, both of Göteborg, all of Sweden

[73] Assignee: Telefonaktiebolaget LM Ericsson, Stockholm, Sweden

[21] Appl. No.: 640,445

[22] Filed: Apr. 30, 1996

[51] Int. Cl.⁶ .................................................. H04J 3/14
[52] U.S. Cl. ............................................................. 370/229
[58] Field of Search .................................... 370/229, 930, 370/935, 936, 937, 252, 253, 351

[56] References Cited

U.S. PATENT DOCUMENTS

| | | |
|---|---|---|
| 4,475,192 | 10/1984 | Fernow et al. . |
| 4,506,358 | 3/1985 | Montgomery . |
| 4,616,359 | 10/1986 | Fontenot . |
| 4,670,871 | 6/1987 | Vaidya . |
| 4,999,829 | 3/1991 | Fite, Jr. et al. . |
| 5,016,243 | 5/1991 | Fite, Jr. . |
| 5,029,164 | 7/1991 | Goldstein et al. ............ 370/236 |
| 5,040,171 | 8/1991 | Osaki . |
| 5,128,932 | 7/1992 | Li . |
| 5,197,127 | 3/1993 | Waclawsky et al. . |
| 5,233,607 | 8/1993 | Barwig et al. . |
| 5,289,462 | 2/1994 | Ahmadi et al. . |
| 5,305,308 | 4/1994 | English et al. . |
| 5,309,341 | 5/1994 | Tominaga et al. . |
| 5,473,604 | 12/1995 | Lorenz et al. . |
| 5,485,455 | 1/1996 | Dobbins et al. . |
| 5,487,061 | 1/1996 | Bray . |

FOREIGN PATENT DOCUMENTS

| | | |
|---|---|---|
| 042 447 | 12/1981 | European Pat. Off. . |
| 225 024 | 6/1987 | European Pat. Off. . |
| 7-66837 | 3/1995 | Japan . |

OTHER PUBLICATIONS

*McGraw–Hill Encyclopedia of Electronics and Computers* 657–658, (2d ed. 1988).

Gary C. Kessler, *ISDN Concepts, Facilities, and Services*, pp. 21–27 and 156–157 (1990).

European Standard Search Report Re: RS 97437, Date of Completion of Search: Dec. 19, 1996.

Hitoshi Uematsu et al., "Architecture of a Packet Switch Based on Banyan Switching Network with Feedback Loops", IEEE Journal on Selected Areas in Communications, vol. 6, No. 9, pp. 1521–1527 (Dec. 1988).

R. Jain., "Congestion Control in Computer Networks: Issues and Trends", IEEE Network Magazine, pp. 24–30 (May 1990).

Gerla M. et al., "Congestion Control in Interconnected Lans", IEEE Network: The Magazine of Computer Communications, vol. 2, No. 1, pp. 72–76 (Jan. 1988).

*Primary Examiner*—Ajit Patel
*Attorney, Agent, or Firm*—Burns, Doane, Swecker & Mathis, L.L.P.

[57] ABSTRACT

A packet switching network having a malfunction list is provided to reduce network congestion. According to an exemplary embodiment, each node in the network includes a malfunction list which stores an unavailability value representing a state of unavailability of certain addressees in the network. Before sending a packet to an addressee, the node consults its own malfunction list to determine the unavailability value of the addressee. A packet addressed to an unavailable addressee is selectively returned to the sender by the node rather than travelling through the network to the addressee and back through the network to the sender. Packets can be returned to the sender with a probability proportional to the unavailability value of the addressee so that transmission is gradually resumed after a state of unavailability as the unavailability value decreases over time.

33 Claims, 6 Drawing Sheets

PACKET DATA COMMUNICATIONS SYSTEM HAVING A MALFUNCTION LIST

BACKGROUND

The present invention relates generally to methods and systems for communications and more particularly to a method and apparatus for reducing congestion in communications systems which send and receive packet data.

In conventional circuit switched networks, the communications pathway between two hosts is fixed for the duration of the connection and is not shared by other hosts. Although several users may share one physical line by use of multiplexing, only one user is assigned to a single channel at any given time. A connection is obtained between two users by establishing a fixed pathway through the network. The route is established after the initiating party initiates a connection procedure by informing the network of the address of the receiving party. The temporary connection through the network exists for the duration of the communication. During that period the circuit is equivalent to a physical pair of wires connecting the two users.

Packet switching networks evolved from the need to conserve data communication resources. In packet switching, there is no dedicated physical connection between two users. Instead, users submit their messages, subdivided into "packets", to the network for delivery to another user. The packets may contain, for example, digital information transmitted between computers or between any other end units or end users. When packets are received by a node in the network, they are placed in buffers and sent on to the next node in the path at the next available opportunity. The user receiving the packets reassembles the original message from the incoming packets which may have a fixed maximum size such as 128 or 256 octets.

The connection between users, therefore, is logical rather than physical in a packet switching network. Since physical channels are not dedicated to a specific connection, they may be shared by many end-to-end logical connections. For example, gaps in communication can be efficiently utilized by providing packets from other connections to fill those gaps. In this way, packet switching can optimize the use of network resources by ensuring that needed physical channels are never idle, except in the absence of traffic.

One of the problems in packet switching networks, however, arises when a large number of mobiles or other end units (hereafter referred to as "senders") attempt to simultaneously send packets to the same receiving party (hereafter referred to as the "addressee"). This might occur, for example, where the addressee provides a service utilized frequently by many users. Although the senders are each low-intensity applications, together they sum up to a great number of packets addressed to the addressee, which may result in congestion in the addressee or in any one of the nodes in the transmission path between the sender and the addressee. It has been found that congestion tends to spread through the network if uncontrolled, rendering the network unavailable to the various users.

In conventional packet switched systems, this situation was typically handled by having a node in the transmission path route back to the senders all packets which it could not process. This method, however, consumes a significant amount of network resources since the packets travel through each node back to each sender, and is likely to cause congestion in the nodes used for transmission.

Today, when a congest situation occurs, the data packet is returned to the original sender from the node where the congestion occurred. Traffic from the sender to any addressee is then blocked for a period of time. This method has been implemented, for example, in the Ericsson MOBITEX system.

SUMMARY

According to an exemplary embodiment of the invention, a malfunction list may be provided in each node of a packet switching network. The malfunction list may contain "unavailability values" (UV) for addressees which indicate that the addressee is unavailable to receive packets. The addressee may be unavailable to receive packets, for example, because the addressee is in a congested state, the addressee is malfunctioning, one of the nodes in the transmission path to the addressee is congested, or for any other reason. Each node preferably consults its malfunction list before sending packets to an addressee through the network. If the malfunction list indicates that the addressee is unavailable, the node selectively returns the packet to the sender rather than sending the packet further through the network to the unavailable addressee. In this way, traffic in the network and the likelihood of congestion are reduced because packets intended for addressees which are unavailable are not routed through the network to the addressee and subsequently returned back through the network to the sender.

The present invention can thus provide significant advantages in packet switching networks. For example, the necessity in conventional systems of returning all excess packets from the node servicing the unavailable addressee back through the network to the sender is eliminated. Instead, packets addressed to an unavailable addressee may be returned promptly to the sender by the sender's source node or by any other node in the transmission path between the sender and the addressee. Thus, a significant amount of unnecessary traffic through the network is eliminated with the result that the switching capacity of the network will not be reduced due to routing packets to addressees which are most likely unreachable.

According to another aspect of the invention, the determination as to whether to return the packets to the sender can be based on a probability proportional to the amount of time since the addressee became unavailable. For example, according to an exemplary embodiment of the invention, one or more nodes in the transmission path between the sender and the addressee, upon receiving a packet returned by the addressee to the sender, set the unavailability value for that addressee to a predetermined maximum number. The unavailability value is then reduced over time so that it eventually reaches a predetermined minimum value, at which point it is removed from the malfunction list. The malfunction list in each node thus includes a list of unavailability values for addressees which were recently unable to receive packets addressed to them. A random number generator can also be provided in each node to generate a normalized random number whenever a received packet is addressed to an addressee listed in the malfunction list. Based on a comparison of the normalized random number and the unavailability value of the addressee, the node determines whether to return the packet to the sender. Because the packets may be selectively transmitted with a probability based on the unavailability value of the addressee, the number of packets sent to the addressee increases gradually after a state of unavailability rather than, for example, increasing abruptly a specified time after the state of unavailability, which promotes the smooth operation of the system.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
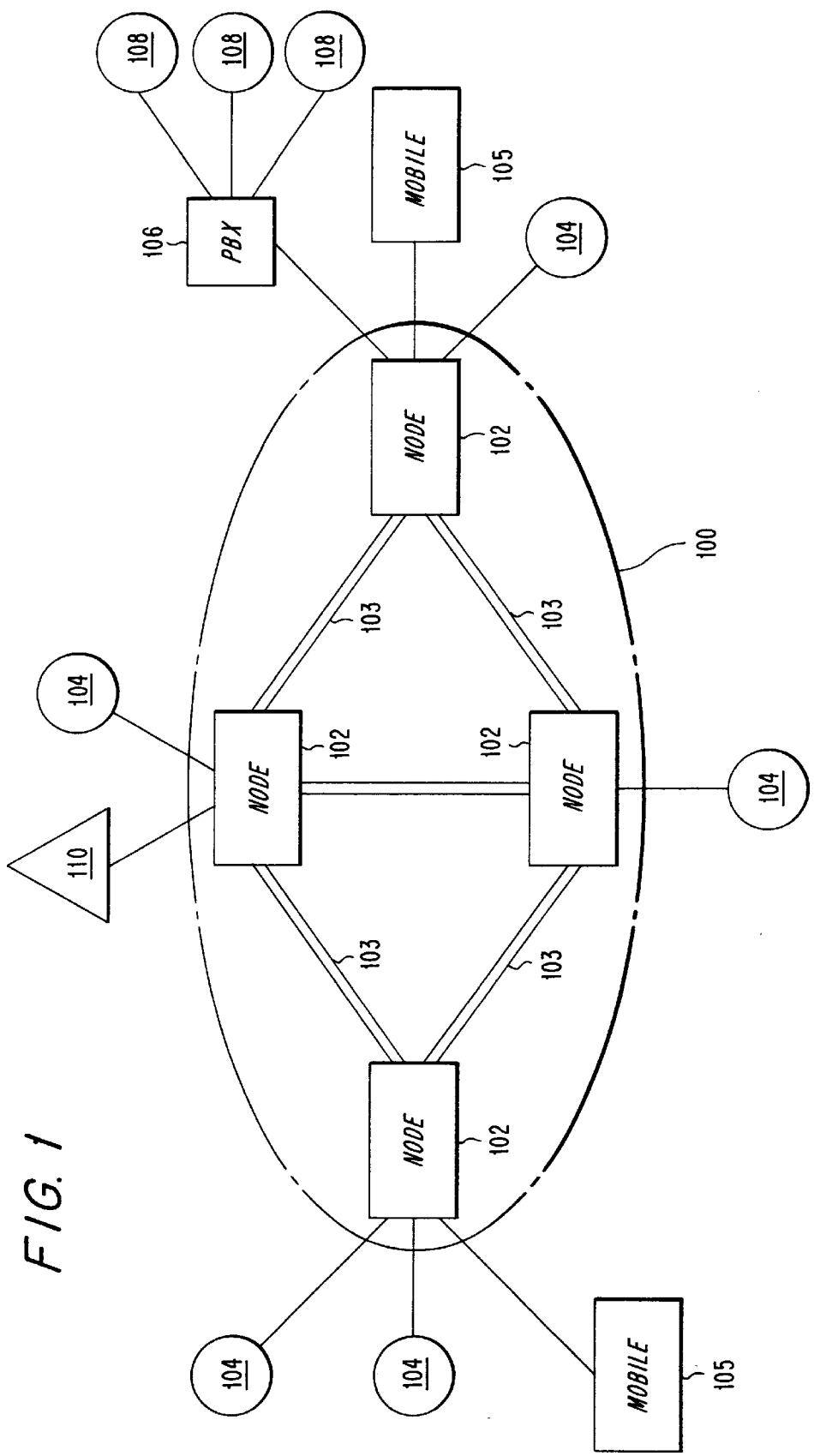
FIG. 1 is a diagram of an exemplary packet communication network.
Figure 3:
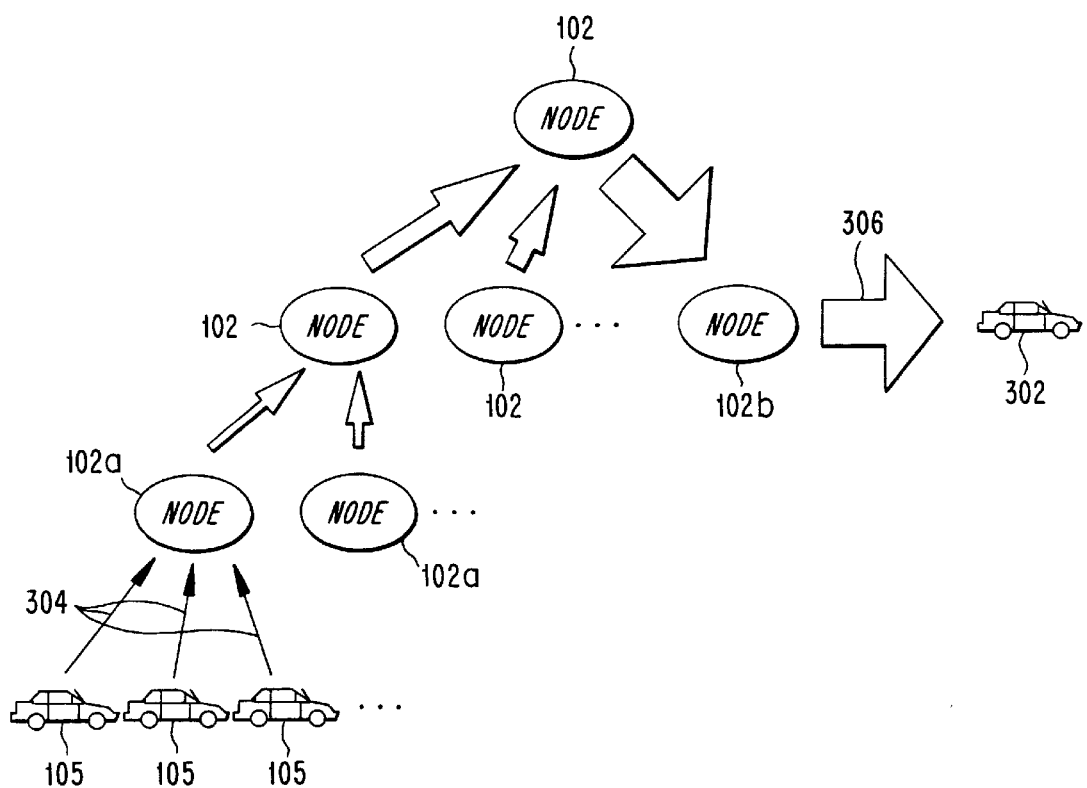
FIG. 3 is a diagram which illustrates the development of a congestion state.

FIG. 1 shows one example of a packet communication network. In FIG. 1, the packet communication network 100 has a circuit configuration such that packet switching nodes 102 are mutually connected by transmission lines 103. Each node 102 may accommodate different types of end units. For example, as shown in FIG. 1, a node 102 may accommodate a plurality of terminals 104, mobiles 105, host computers 110, a private branch exchange (PBX) 106 which accommodates internal terminals 108, or any combination of end units which send and receive packet data. The network configuration of FIG. 1 is described by way of example, and a network configuration of a larger network scale can be constructed in practice. For example, according to a preferred embodiment, the network has an ordered structure such as a hierarchical structure. FIG. 3 illustrates an example of a packet switching network which has a hierarchical structure. In FIG. 3, the nodes 102a are source nodes which form the lowest level of the hierarchy. The source nodes 102a may be base stations, for example, if the end users are mobiles. Above the source nodes 102a are intermediate nodes which may, for example, transmit packets between lower level nodes such as source nodes and higher level nodes in the network. In some cases, a node may act as both a source node and as an intermediate node. For example, as shown in FIG. 3, node 102b exchanges packets with the end user 302 and can thus be considered to be a source node. Node 102b, however, could also be configured to receive packets from one node and to transmit the packets to a second node, thus acting as an intermediate node. A primary node is at the top of the network hierarchy and may be configured to exchange packets with a plurality of intermediate nodes. The network in FIG. 3 is preferably arranged so that there is a single available path from the sender to the addressee.

Figure 2:
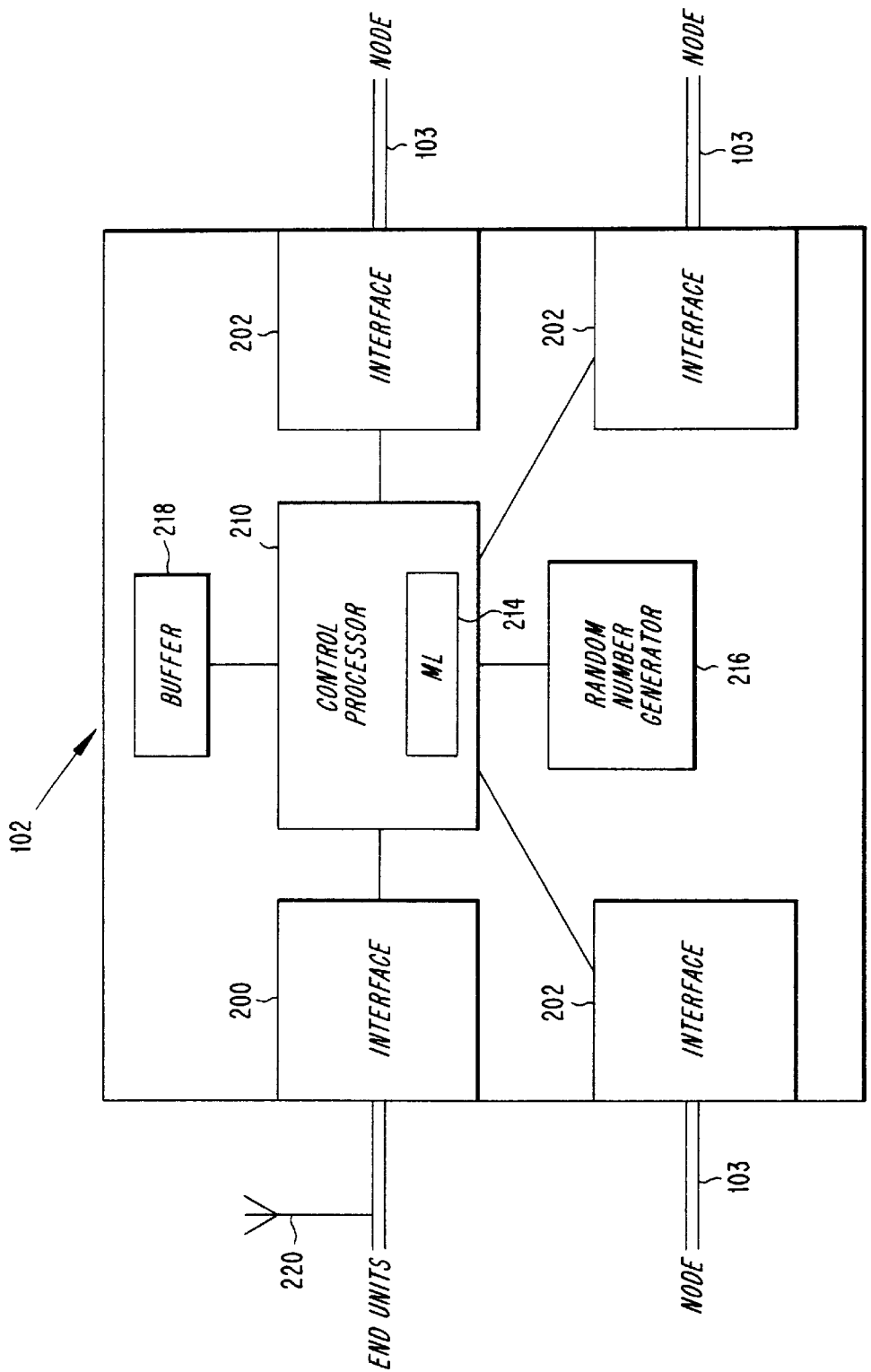
FIG. 2 is a block diagram of an exemplary packet switching node of FIG. 1.

FIG. 2 is a functional block diagram of one of the nodes shown in FIGS. 1 or 3. The node 102 generally comprises a control processor 210 which controls the routing of packets through the node 102 according to an address contained within the packet header. The node 102 is connected to other nodes in the network through transmission lines 103. The node may also be connected to end units such as mobiles, terminals, and host computers. In the situation where the end units are mobiles, the node effectively functions as a conventional base station which may include an antenna 220. An interface unit 200 may be provided to reformat packets received and transmitted from the end units. In addition, a transmission line interface unit 202 may be provided for each incoming transmission line 103 to perform any desired changes in data format upon data entering and exiting the node 102 through the transmission lines 103. For example, the interface units 200 and 202 may modify the header of received packets to indicate that the packet has passed through that node. In addition, or in the alternative, the header may contain a state variable which can be modified by the interface units at any node to indicate the state of the addressee or of the network. For example, the state variable can indicate that the addressee is congested, the addressee is malfunctioning, an error exists in the network such as a broken transmission line, a node in the transmission path to the addressee is congested, or any other state or condition of the addressee or network. The interface units 200 and 202 may also convert the data received from the end units and the transmission lines 103 into packet data of a common protocol, independent of communication media so that the control processor 210 can efficiently route the packets through the network.

The node 102 may include a buffer 218 which stores received packets awaiting transmission to the next node or end unit. The buffer 218 may comprise a conventional memory which is utilized by the control processor 210 to store and retrieve packets. The control processor 210 retrieves packets from the buffer 218 and routes them to the proper node or end unit based on address information contained in the header of the packet.

According to one embodiment of the invention, each source node 102a includes a malfunction list 214 and a random number generator 216, as will be described in greater detail below. The malfunction list 214 stores unavailability values of addressees for which packets have been returned. The random number generator 216 may be utilized in determining whether to send packets to an addressee based on the unavailability value. The unavailability of an addressee is preferably detected by the control processor 210 based on a packet being returned to the sender after having failed to reach an unavailable addressee. The unavailability of an addressee, however, can also be detected by the receipt of any suitable message, other than a packet, which identifies the addressee.

A packet may fail to reach the addressee due to congestion in one of the nodes in the transmission path or due to a congested or malfunctioning addressee, for example. To detect whether a packet is being returned to the sender, the control processor 210 may, for example, scan each packet header, which may be modified at each node to indicate that the packet has passed through that node. The control processor 210 can therefore determine from the header whether the packet is a packet returned from an unavailable addressee, in which case the unavailability value for that addressee is set to its maximum value. The control processor 210 can also be programmed to interpret the receipt of any suitable message which identifies the addressee as an indication that the addressee is unavailable.

According to a preferred embodiment of the invention, all other nodes in the network, in addition to the source nodes, include a malfunction list containing unavailability values. Intermediate nodes may detect a state of unavailability of an addressee in the same way that the source nodes detect the unavailability of the addressee. For example, the control processor of the intermediate node may scan each packet header passing through the intermediate node to determine whether the packet is a packet being returned after having failed to reach an unavailable addressee, in which case the unavailability value for that addressee is set to its maximum value. Alternatively, the control processor may interpret the receipt of a message identifying the addressee as an indication that the addressee is unavailable. Maintaining a malfunction list in the intermediate nodes as well as the source nodes allows intermediate nodes to return packets addressed to unavailable addressees before the packets travel any further through the network. This may be advantageous, for example, in the situation where an intermediate node, but not the source node, has the addressee listed in the malfunction list.

FIG. 3 illustrates a common situation in which congestion may develop in a source node 102b serving an addressee 302 or in any other node in the transmission path between the sender and the addressee 302. In FIG. 3, a plurality of nodes are interconnected to form the communications network. A mobile fleet comprising mobiles 105 is serviced by a plurality of source nodes 102a. In this example, all of the mobiles 105 are senders. The source nodes 102a route the packets of the sender mobiles 105 through other nodes in the network, e.g. intermediate nodes, to the addressee 302, which may also be a mobile or which may be any other end unit such as a fixed terminal. Although each sender mobile 105 constitutes a low intensity application, when a large number of mobiles 105 attempt to simultaneously send packets to the same addressee 302, the amount of combined packets may easily exceed the capacity of the source node 102b or other node in the transmission path to the addressee 302. This is illustrated in FIG. 3 with small arrows 304 representing a relatively small number of packets transmitted from each individual sender mobile 105 to its associated source node 102a, and larger arrows 306 representing the increasing amount of packet data transmitted through the nodes 102 as packets converge en route to the addressee 302. If enough mobiles 105 call the addressee 302 at the same time, the buffer in the source node 102b servicing the addressee 302 will become completely filled, with the result that the source node 102b is unable to send all the packets to the addressee 302. Congestion may also occur at other nodes in the transmission path which are closer to the sender.

Figure 4:
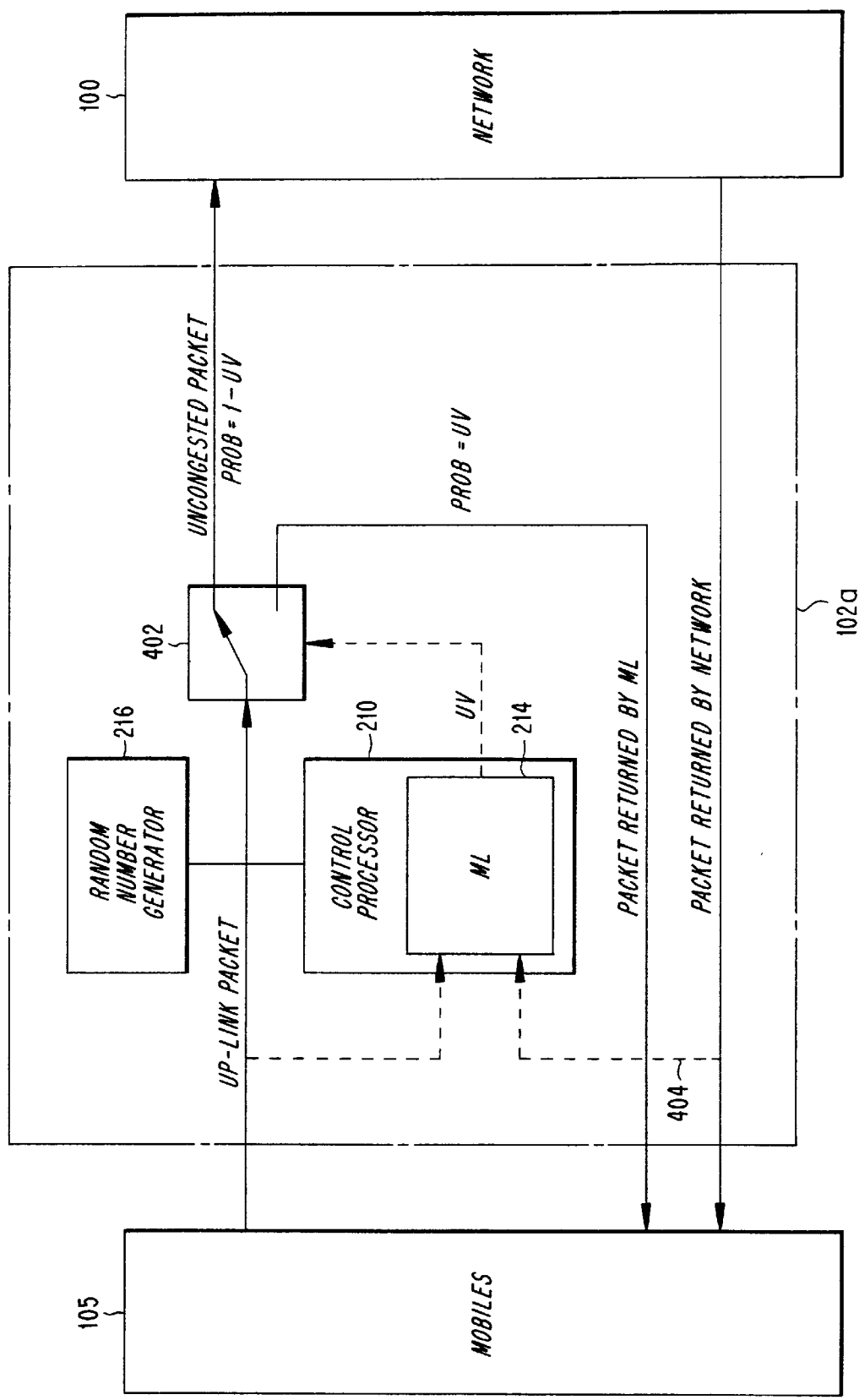
FIG. 4 is a block diagram of a source node showing connections to mobiles and other end units and to the packet switching network.

FIG. 4 shows a block diagram of an exemplary embodiment of the invention which addresses the aforementioned problems associated with an unavailable addressee. In FIG. 4, block 105 represents the mobiles 105 or other end units which are serviced by the source nodes 102a. Block 100 represents the remainder of the network, including other nodes 102, transmission lines 103, end units 104, 105, 106, 108, 110, etc. The source node 102a shown in FIG. 4 includes a malfunction list 214 which stores information on the unavailability of addressees. By way of example, the malfunction list 214 may contain unavailability values for addressees which have recently become unavailable. Although the node 102a shown in FIG. 4 is a source node, other nodes in the network may include the elements shown in the source node 102a of FIG. 4, such as the malfunction list 214, the control processor 210, the random number generator 216, etc.

The control processor 210 controls transmission of packets to addressees based on the data in the malfunction list 214. When an up-link packet is received from a mobile 105 or other end unit, the address of the addressee indicated in the packet header is read by the control processor 210. The control processor 210 then accesses the malfunction list 214 to determine whether the addressee is listed, and if so to recall the unavailability value for that addressee. Based on the recalled unavailability value, the control processor 210 controls a switch 402 to either allow the packet to proceed to the addressee or to return the packet to the sender. The switch 402 generally represents the function of the control processor 210 in routing packets through the node according to the unavailability value of the intended addressee.

The unavailability values of the various addressees, according to an exemplary embodiment of the invention, may be updated as follows. When an addressee becomes unable to receive packets addressed to it, for example because it is malfunctioning, because its source node is congested, because a node in the transmission path is congested, or for any other reason, the packets are returned through the network 100 to the sender. When a packet returns to the sender through the nodes in the transmission path, the control processor 210 in each node records that the packet intended for the addressee is being returned. Alternatively, any suitable message returned to the sender as a result of a packet failing to reach the addressee can be used to detect the unavailability of the addressee. For example, rather than returning an entire packet to the sender, the packet header alone could be returned to the sender to indicate the unavailability of the addressee. Alternatively, any message returned to the sender which identifies the addressee could be used to detect the unavailability of the addressee.

The control processor 210 in each node then sets the unavailability value of the addressee to a maximum value, for example 1. This is represented generally in FIG. 4 by arrow 404 which represents the detection of the packet or other message returned from the network 100 and the resultant updating of the malfunction list 214. Thereafter, the unavailability value may be decreased over time so that it eventually returns to a minimum value such as zero. For example, the unavailability value may be decreased periodically so that it returns to the minimum value in 2–3 minutes. When the unavailability value for an addressee decreases to the minimum value, that addressee may be removed from the malfunction list 214.

Figure 5:
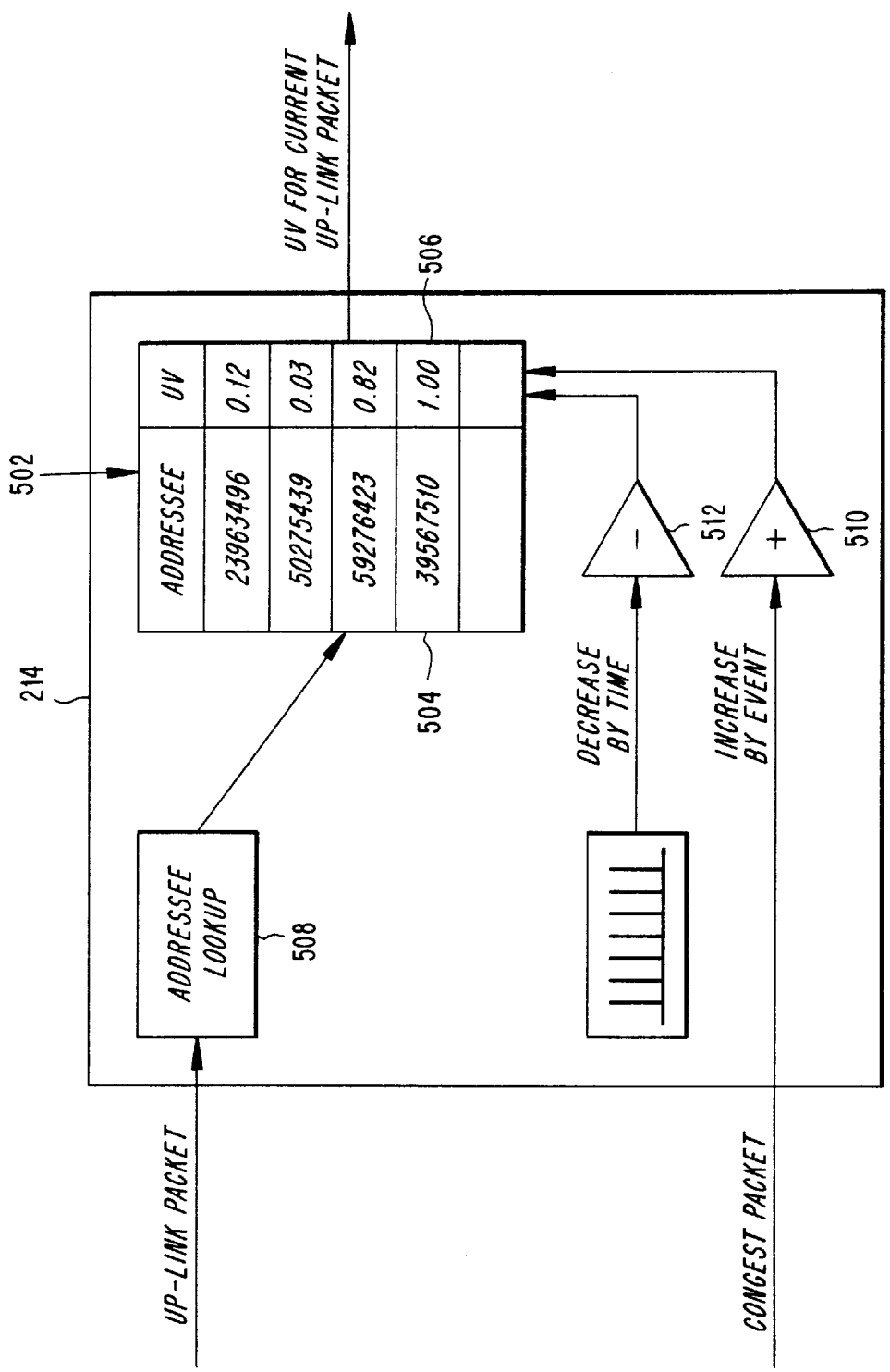
FIG. 5 is a diagram of an exemplary embodiment of the malfunction list shown in FIGS. 2 and 4.

FIG. 5 shows a schematic diagram of the malfunction list 214. In FIG. 5, the malfunction list 214 includes a table 502 for storing an identification number 504 of addressees and corresponding unavailability values 506 for the addressees. When a source node 102a receives an up-link packet, or when any node in the transmission path receives a packet, the control processor 210 in that node consults the malfunction list table 502 to determine whether the addressee is currently listed. If the addressee is included in the malfunction list 214, the control processor 210 recalls the unavailability value 506 of the addressee, generally represented at 508, based on the addressee's identification number 504. The control processor 210 also serves to monitor packets returned to the sender from the network 100 so that it can update the unavailability values of each addressee. This is represented in FIG. 5 in block 510. According to a preferred embodiment, the control processor 210 decreases the unavailability value of the addressee periodically over time, as represented by block 512.

According to one exemplary method for controlling the transmission of packets to addressees, the control processor 210, upon receiving a packet from a sender, determines whether the addressee is listed in the malfunction list, and if so, retrieves the unavailability value of the addressee. The control processor 210 also stores a threshold value which determines whether the packet will be sent. The stored threshold value preferably ranges between the upper and lower limits of the unavailability value. If the control processor 210 determines that the unavailability value of the intended addressee is greater than the stored threshold value, the packet is subsequently returned to the sender. On the other hand, if the control processor 210 determines that the unavailability value of the intended addressee is less than the stored threshold value, the packet is allowed to be transmitted to the addressee. Thus, two states are possible according to this exemplary method. In the first state, which occurs from the beginning of unavailability to the point at which the unavailability value decreases to below the stored threshold value, all packets addressed to the unavailable addressee are returned to the sender. In the second state, which begins after the unavailability value decreases to below the stored threshold value, the transmission of all packets to the addressee is resumed. At this point, the addressee may be removed from the malfunction list.

Because the unavailability value is decreased periodically over time according to a preferred embodiment, the stored threshold value thus controls the time delay between an unavailability state where no packets are allowed to proceed and the point at which all packets are once again allowed to be transmitted to the addressee. The time delay before the resumption of packet transmission can thus be adjusted by adjusting the stored threshold value so that for a desired time period after a state of unavailability, no packets are transmitted to the unavailable addressee, which allows the addressee a period of time to recover.

According to another exemplary method for controlling the transmission of packets to addressees, each node in the network includes a random number generator 216, as shown in FIG. 4. The random number generator 216 is commanded by the control processor 210 to generate a random number whenever it receives a packet addressed to an addressee listed in the malfunction list. The control processor 210 preferably normalizes (scales) the random number so that its value ranges between the upper and lower limits of the unavailability value, e.g., between zero and one. The control processor 210, according to a preferred embodiment, upon receiving the random number, determines whether the random number is greater than or less than the unavailability value of the addressee. If the random number is greater than the unavailability value, the control processor commands the switch 402 to allow the packet to be transmitted to the addressee. On the other hand, if the random number is less than the unavailability value of the addressee, the control processor 210 commands the switch 402 to return the packet to the sender.

In this way, a packet which is being sent to an unavailable addressee will be returned to the sender with a probability equal to the unavailability value of the addressee, assuming the unavailability value ranges between zero and one. Conversely, a packet will be sent to the addressee with a probability of one minus the unavailability value of the addressee, assuming the unavailability value ranges between zero and one. Thus, the likelihood of a packet being returned to the sender is proportional to the unavailability value of the addressee. If the addressee has recently experienced a congestion state and thus has a high unavailability value, most packets addressed to the addressee will be returned to the sender by the source node or by another node in the transmission path. Conversely, as the unavailability value of a particular addressee is decreased over time, packets addressed to the addressee will be increasingly likely to be transmitted to the addressee. However, if a packet is sent and returned after the unavailability value has begun to decrease, the malfunction list will update the unavailability value to the maximum value.

This exemplary method which includes the random number generator provides the advantage that after an addressee becomes unavailable, the control processor 210 gradually increases from zero the transmission of packets to the addressee as the unavailability value for that addressee gradually decreases over time, rather than abruptly allowing all packets to be transmitted upon the happening of a certain time or event. The gradual resumption of transmission of packets to the addressee results in a smooth transition from a state of unavailability to a state of availability, which may advantageously reduce the likelihood that the addressee will once again become unavailable, for example if the transmission of packets were to be abruptly resumed.

Figure 6:
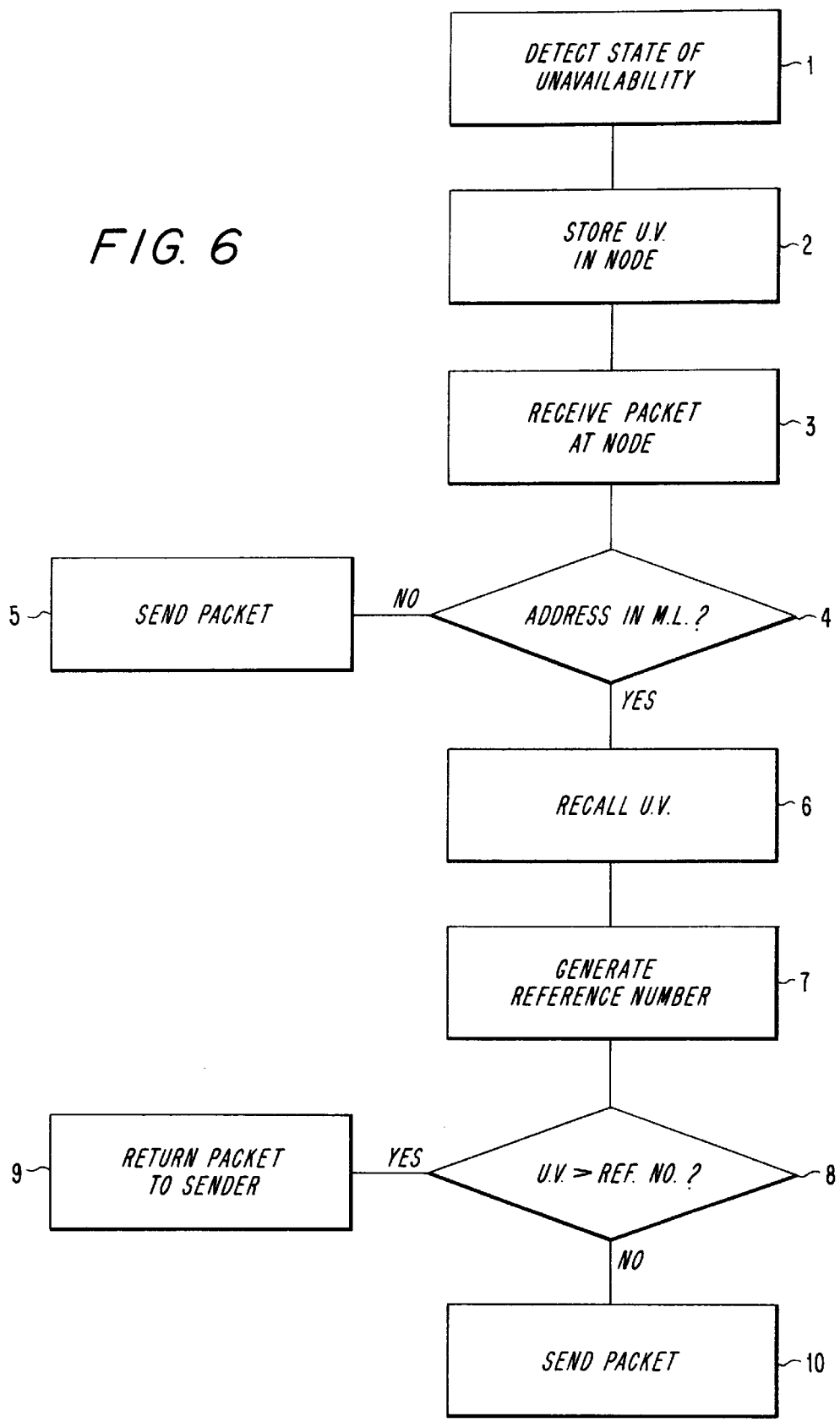
FIG. 6 is a flowchart illustrating a method according to an exemplary embodiment of the invention.

FIG. 6 is a flowchart which illustrates the above described exemplary methods. At step 1, a node in the transmission path between the sender and the addressee detects that the intended addressee is unavailable. This may be accomplished, for example, by the control processor 210 of that node scanning the header of the packet and determining that the packet has been returned before reaching its intended addressee. Alternatively, the unavailability of the addressee may be detected by the control processor 210 receiving any suitable message which identifies the addressee. At step 2, the node sets an unavailability value for the unavailable addressee to a maximum value and stores the unavailability value. Subsequently, when the node receives a packet for transmission to an addressee at step 3, the node consults the malfunction list to determine whether the addressee is on the malfunction list at step 4. If the addressee is not listed on the malfunction list, the packet is allowed to proceed to the addressee in step 5. If the addressee is listed on the malfunction list, the unavailability value for the addressee is recalled in step 6 so that it can be compared with a reference number generated in step 7. The reference number may be, for example, a normalized random number or a fixed threshold value. At step 8, the unavailability value for the addressee is compared to the reference number. If the unavailability value is greater than the reference number, the packet addressed to the addressee is returned to the sender in step 9. If the unavailability value is less than the reference number, the packet is allowed to proceed normally through the network to the addressee in step 10.

As will be appreciated by those skilled in the art, exemplary embodiments of the present invention can provide significant advantages in packet switching networks. For example, the necessity in conventional systems of returning all excess packets from the node servicing an unavailable addressee back through the network to the sender is eliminated. Instead, packets addressed to an unavailable addressee may be returned promptly to the sender, for example with a probability equal to the unavailability value for that addressee. Further, since all nodes including source nodes preferably maintain a malfunction list, packets addressed to unavailable addressees generally do not propagate far through the network before they are detected and returned to the sender. Thus, a significant amount of unnecessary traffic through the network is eliminated. Also, because the packets may be selectively transmitted with a probability based on the unavailability value of the addressee, rather than transmission being abruptly resumed after a certain time or event takes place, the possibility of subsequent congestion or unavailability of the addressee can be reduced.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A packet switching method comprising the steps of:
   detecting in a node in a transmission path from a first user of a packet switching network to a second user a state of unavailability of the second user;
   storing in the node a value representing the state of unavailability of the second user; and
   selectively returning a packet received from the first user and addressed to the second user to said first user from the node based on the value representing the state of unavailability of the second user.

2. The packet switching method of claim 1, wherein the unavailability state of the second user is detected by determining that a packet received at the node was returned before reaching the second user.

3. The packet switching method of claim 1, wherein the unavailability state of the second user is detected by receiving at the node a message which identifies the addressee as being unavailable.

4. The packet switching method of claim 1, wherein the node is a source node.

5. The packet switching method of claim 1, further comprising the steps of:
   representing the state of unavailability of the second user with a value which ranges between a first number and a second number;
   generating a random number which is normalized to range between the first number and the second number; and
   returning a packet received from the first user to said first user when the normalized random number is less than the value which represents the state of unavailability of the second user.

6. The packet switching method of claim 1, further comprising the step of decreasing over time the value representing the state of unavailability of the second user.

7. The packet switching method of claim 1, further comprising the step of storing in said node a plurality of values which represent states of unavailability of a plurality of users of the network.

8. The packet switching method of claim 1, further comprising the steps of:
   representing the state of unavailability of the second user with a value which ranges between a first number and a second number;
   setting a threshold value between the first number and the second number; and
   returning a packet received from the first user to said first user when the value representing the state of unavailability of the second user is greater than the threshold value.

9. The packet switching method of claim 1, wherein the node is connected to a second node of a different level in a hierarchical packet switching network.

10. A packet switching apparatus comprising:
    a first node and a second node which transmit and receive packets in a transmission path between a first user and a second user;
    a control processor which detects in the first node a state of unavailability of the second user;
    a memory for storing in the first node a value representing the state of unavailability of the second user; and
    wherein the control processor selectively returns to the first user a packet received from the first user and addressed to the second user based on the value representing the state of unavailability of the second user stored in the memory.

11. The packet switching apparatus of claim 10, wherein the first node and the second nodes are source nodes.

12. The packet switching apparatus of claim 10, wherein at least one of the first node and the second node is an intermediate node not directly connected to the first user or to the second user.

13. The packet switching apparatus of claim 10, wherein the value representing the state of unavailability of the second user ranges between a first number and a second number; and
    wherein the first node further comprises a random number generator for generating a random number normalized between the first number and the second number, and wherein the control processor returns a packet received from the first user to the first user when the random number generated by the random number generator is less than the value representing the state of unavailability of the second user.

14. The packet switching apparatus of claim 10, wherein the control processor is adapted to decrease over time the value representing the state of unavailability of the second user.

15. The packet switching apparatus of claim 10, wherein the value representing the state of unavailability of the second user ranges between a first number and a second number; and
    wherein the first node comprises a memory for storing a threshold value ranging between the first number and the second number, and wherein the control processor returns a packet received at the first node from the first user to the first user when the value representing the state of unavailability of the second user is greater than the threshold value.

16. The packet switching apparatus of claim 10, wherein the control processor returns a packet received at the first node from the first user to the first user with a probability based on the value representing the state of unavailability of the second user.

17. The packet switching apparatus of claim 10, wherein the control processor detects the state of unavailability of the second user by receiving a message which identifies the second user as being unavailable.

18. The packet switching apparatus of claim 17, wherein the message is a packet returned to the first user before reaching the second user.

19. A method comprising the steps of:
    receiving at a first node a packet from a first party to be transmitted to a second party;
    recalling at the first node a value stored in the first node which represents a state of unavailability of the second party; and
    selectively returning the packet to the first party from the first node based on the value stored in the first node which represents the state of unavailability of the second party.

20. The method of claim 19, further comprising the step of detecting in the first node a state of unavailability of the second party.

21. The method of claim 20, wherein the step of detecting the state of unavailability of the second party is carried out by receiving a message in the first node which identifies the second party as being unavailable.

22. The method of claim 19, further comprising the step of detecting in a second node in a transmission path between the first party and the second party a state of unavailability of the first party.

23. The method of claim 22, wherein the first node and the second node are source nodes.

24. The method of claim 22, wherein at least one of the first node and the second node is an intermediate node not directly connected to the first party or to the second party.

25. The method of claim 19, wherein the packet is returned to the first party from the first node with a probability equal to the value representing the state of unavailability of the second party.

26. The method of claim 19, further comprising the step of periodically decreasing the value representing the state of unavailability of the second party.

27. The method of claim 19, further comprising the step of storing in the first node the value which represents the state of unavailability of the second party responsive to receiving at the first node a packet returned to the first party before reaching the second party.

28. A packet switching network comprising:
    a plurality of source nodes which form a first level in a hierarchy of the packet switching network, each of the source nodes including;
        means for detecting a state of unavailability of an addressee;
        a memory for storing a value representing the state of unavailability of the addressee detected by the detecting means; and
        means for selectively returning a packet addressed to the addressee based on the value representing the state of unavailability of the addressee stored in the memory; and
    a plurality of intermediate nodes, connected to the source nodes, which form a second level in the hierarchy of the packet switching network.

29. The packet switching network of claim 28, wherein each of the intermediate nodes also comprises:
    said means for detecting a state of unavailability of an addressee;
    said memory for storing a value representing the state of unavailability of the addressee detected by the detecting means; and
    said means for selectively returning a packet addressed to the addressee based on the value representing the state of unavailability of the addressee stored in the memory.

30. The packet switching network of claim 28, wherein the means for detecting detects a state of unavailability of an addressee based on a packet being returned before reaching the addressee.

31. The packet switching network of claim 28, wherein the means for detecting detects a state of unavailability of an addressee based on receiving a message which identifies the addressee as being unavailable.

32. The packet switching method of claim 1, wherein said value is associated with a probability that said second user is unavailable.

33. The packet switching apparatus of claim 10, wherein said value is associated with a probability that said second user is unavailable.

\* \* \* \* \*